US006568363B2

(12) United States Patent
Koyama et al.

(10) Patent No.: US 6,568,363 B2
(45) Date of Patent: May 27, 2003

(54) AUXILIARY MACHINERY MOUNTING STRUCTURE OF AN ENGINE

(75) Inventors: Yoshiaki Koyama, Wako (JP); Takayuki Yamagata, Wako (JP); Tsutomu Sato, Wako (JP); Shigeru Suzuki, Wako (JP); Ayumu Matsuo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,518

(22) Filed: Aug. 23, 2001

(65) Prior Publication Data

US 2001/0054409 A1 Dec. 27, 2001

(30) Foreign Application Priority Data

Aug. 25, 2000 (JP) ....................................... 2000-255392
Aug. 28, 2000 (JP) ....................................... 2000-258214

(51) Int. Cl.$^{7}$ ............................ F02B 77/14; B60K 5/12

(52) U.S. Cl. ................... 123/195 A; 180/297; 248/638; 248/674

(58) Field of Search ......................... 123/195 A, 196 R, 123/198 C; 180/297; 248/637, 638, 674, 675

(56) References Cited

U.S. PATENT DOCUMENTS

| | | | | | |
|---|---|---|---|---|---|
| 4,516,546 A | * | 5/1985 | Choushi et al. | ......... | 123/195 A |
| 4,793,300 A | * | 12/1988 | Kadoshima et al. | .... | 123/195 A |
| 4,950,210 A | * | 8/1990 | Kawauchi et al. | .......... | 474/144 |
| 5,035,397 A | * | 7/1991 | Yamada | ...................... | 248/638 |
| 5,129,479 A | * | 7/1992 | Fuji et al. | ................... | 180/297 |
| 5,193,642 A | * | 3/1993 | Miyake | ...................... | 180/312 |
| 6,196,182 B1 | * | 3/2001 | Kawamura | ............. | 123/195 A |

FOREIGN PATENT DOCUMENTS

JP 8-28231 1/1996

* cited by examiner

*Primary Examiner*—Tony M. Argenbright
(74) *Attorney, Agent, or Firm*—Armstrong, Westerman & Hattori, LLP

(57) ABSTRACT

An auxiliary machinery mounting structure of an engine which can reduce the entire length of the engine, enhance the rigidity of a cover seal surface to improve the sealing effect, and also enhance the mounting rigidity of an auxiliary machinery. The auxiliary machinery mounting structure includes a mount seat that is integrally formed on an end surface of a cylinder block extending vertically to a crank shaft of the engine to lie outward of and along a cover seal surface that is a surface engaging with a cover laid over the end surface, and the auxiliary machinery is mounted on the mount seat.

14 Claims, 12 Drawing Sheets

AUXILIARY MACHINERY MOUNTING STRUCTURE OF AN ENGINE

BACKGROUND OF THE INVENTION

1. Field of the Invention

This invention relates to a mounting structure for mounting an auxiliary machinery of an engine to an engine body.

2. Description of the Related Art

There is a typical structure in which a timing belt is rotatably provided along an end surface of a cylinder block of a four-cycle engine to transmit power to a valve driving mechanism and a timing belt cover is fixed to the end surface of the cylinder block so as to cover the timing belt.

FIG. 12 is an example disclosed in Japanese Patent Laid-Open Publication No. hei 8-28231, in which an oil pump body 03 is partially fixed to an end surface of a cylinder block 01 (end surface vertical to the crank shaft), and a cover 03 extends from the cylinder block 01 to the cylinder head to cover the timing belt. The cover 03 covers a part of the oil pump body 02.

Therefore, a hydraulic control valve 04 as an auxiliary machinery is mounted on a seat surface formed on the oil pump body 02 not interfering with the cover 03 so as to minimize the entire length of the engine in the lengthwise direction of the crank shaft.

However, because the hydraulic control valve 04 results in being mounted to the cylinder block 01 via the oil pump body 02, the entire length of the engine remains large by the amount corresponding to the width of the oil pump body 02.

To ensure rigidity of mount seat for mounting the hydraulic control valve 04, the oil pump body 02 is required to be thick, and this further increases the entire length of the engine.

It is therefore difficult to ensure a sufficient rigidity of the cover seal surface for engaging the cover 03 located near the mount seat of the oil pump body 02 difficult to be sufficiently rigid.

Additionally, if an auxiliary machinery is mounted through a bracket, it increases the number of parts and invites a decrease of the mounting rigidity of the auxiliary machinery.

Under those circumstances, it is an object of the present invention to provide an auxiliary machinery mounting structure of an engine capable of reducing the entire length of the engine, enhancing the rigidity of the cover seal surface thereby to improve the sealing efficiency and also improving the mounting rigidity of the auxiliary machinery.

In addition, in case a power unit incorporating an engine and a transmission is tried to be mounted to a vehicle body from the bottom of the vehicle body by lifting the power unit through between a pair of frames, the distance of the pair of frames in a conventional structure had to be larger than the size of the power unit itself plus the size of the mount bracket. Therefore, largely spaced frames have been inevitably made and the power unit was mounted thereon, and it has been regarded inevitable that the vehicle width increases. Furthermore, in case the power unit is mounted to a compact vehicle body having narrow-spaced frames, another method has been employed, which mounts the power unit by lowering it from above the frame. This method, however, involves the disadvantage that the process of mounting the power unit requires man-hour.

It is therefore a further object of the invention to provide a mount device having a mount bracket that permits an engine/transmission-incorporated power unit to be mounted to a vehicle body having a pair of frames spaced by a distance narrower than the size of the power unit itself plus the dimension required for the mount bracket by lifting the power unit from the bottom side, thereby to enable downsizing of vehicles.

SUMMARY OF THE INVENTION

According to the present invention, there is provided an auxiliary machinery mounting structure of and engine comprising a mount seat for an auxiliary machinery, the mount seat being integrally formed on an end surface of a cylinder block extending vertically to a crank shaft of the engine to lie outward of and along a cover seal surface which is a surface engaging with a cover laid over the end surface, and an auxiliary machinery being mounted on the mount seat.

According to the present invention, because a mount seat with a sufficient thickness can be formed on an end surface of the cylinder block without increasing its thickness, and an auxiliary machinery can be attached directly to the mount seat, entire length of the engine including that of the auxiliary machinery can be reduced.

In addition, because the mount seat is formed in the cylinder block, it has a high rigidity, and the cover seal surface formed along the mount seat is also ensured to have a high rigidity, thereby to improve the sealing effect in combination of the cover and improve the mounting rigidity of the auxiliary machinery.

In the auxiliary machinery mounting structure of the engine, the mount seat is preferably formed to thrust into a blow-by gas path formed in the cylinder block.

With this arrangement, because the mount seat thrusts into the blow-by gas path, the passage area of the blow-by gas path partly changes, and it is expected that separation of blow-by gas to air and liquid is promoted. At the same time, since the mount seat extends into the blow-by gas path, it contributes to downsizing the engine.

Still in the auxiliary machinery mounting structure of the engine, the auxiliary machinery may be an auto tensioner.

In this configuration, since the auto tensioner can be attached to the high-rigidity mount seat formed on the end surface of the cylinder block, the auto tensioner normally loaded with a counter force to the biasing force can be fixed firmly.

The auxiliary machinery mounting structure of the engine may be configured to mount the auxiliary machinery directly to the mount seat formed in the cylinder block.

With this configuration, since the auxiliary machinery can be mounted directly to the mount seat formed in the cylinder block, easy and firm attachment of the auxiliary machinery in the engine is ensured.

In the auxiliary machinery mounting structure of the engine, the engine may be of a V-bank type in which a plurality of cylinders are offset from each other in the crank shaft lengthwise direction, and the auxiliary machinery may be located in a space made by the offset arrangement of the cylinders.

With this arrangement, the entire length of the engine including that of the auxiliary machinery can be reduced in the crank shaft lengthwise direction.

Still in the auxiliary machinery mounting structure of the engine, the engine may be of a V-bank type in which a plurality of cylinders are offset from each other in the crank shaft lengthwise direction, and the blow-by gas path of the cylinder block may be formed in a space made by the offset arrangement of the cylinders.

With this arrangement, since the mount seat is formed to thrust into the blow-by gas path formed in the space made by the offset arrangement, the engine itself is effectively downsized, and a partial change of the path area of the blow-by gas path effectively promotes separation of the blow-by gas to air and liquid.

According to the invention, there is further provided a power unit mounting device used at a portion where a power unit is suspended to one of vehicle frames when mounted by lifting it from below and through the vehicle frames, characterized in that a mount bracket to be attached to the power unit is composed of a stump portion having a short size and an extension to be connected to make up the full length required for the mount bracket.

With this configuration, upon mounting the power by raising it from below and between the vehicle frames, when the device is attached only at its short stump portion and raised, since the gap between the frame and the power unit is large, the power unit can be mounted easily, and the workability can be improved.

The extension of the mount bracket may be mounted at a position overlapping the vehicle frames when viewed from above.

With this configuration, even when the pair of frames have a gap too narrow for a power plant having mounted a mount bracket with a full size to pass through from below to above, the power unit having mounted only the stump portion of the short mount bracket can pass through from below to above. The extended portion can be attached after the power unit passes through to form the integral mount bracket with the full size, and this can be provided for mounting the power plant. Since it enables the mounting of the power plant by lifting it even in a vehicle having narrow-spaced frames, the invention contributes to downsizing the vehicle body.

An end surface of a cylinder block vertical to a crank shaft of an engine, which forms a part of the power unit, may be oriented substantially in parallel to the frames, and a mount seat for an auxiliary machinery may be integrally formed at a position along the cover seal surface outside the cover seal surface for engaging with the cover laid over the end surface of the cylinder block, such that the auxiliary machinery can be mounted on the mount seat and the mount bracket is attached to the end surface of the cylinder block.

With this configuration, the auxiliary machinery is mounted on the mount seat along the end surface of the cylinder block substantially in parallel to the vehicle frames, and the mount bracket is attached to the end surface of the cylinder block. As a result, even after the auxiliary machinery is attached to the cylinder block, the power unit can be easily mounted to the vehicle frames.

An end surface of the cylinder block vertical to the crank shaft of the engine, which forms a part of the power unit, may be oriented substantially in parallel to the frames, and the mount seat for the auxiliary machinery may be integrally formed at a position along the cover seal surface outside the cover seal surface for engaging with the cover laid over the end surface of the cylinder block, such that the auxiliary machinery can be mounted on the mount seat and the mount seat thrusts into the blow-by gas path formed in the cylinder block.

With this configuration, in the mount device capable of easily mounting the power unit to the vehicle frames, the engine having a blow-by gas path exhibiting a high effect of separating blow-by gas to air and liquid can be decreased in size.

The engine forming a part of the power unit may be of a V-bank type in which a plurality of cylinders are offset from each other in the crank shaft lengthwise direction, an end surface of the cylinder block vertical to the crank shaft may be oriented substantially in parallel with the frames, the mount bracket may be attached to the end surface of the cylinder block, and the auxiliary machinery may be located in a space made by the offset arrangement of the cylinders.

With this configuration, the auxiliary machinery can be located on the end surface of the cylinder block of the engine so that it does not project externally from the end surface, and the power unit can be mounted to the vehicle frames more easily and reliably.

The engine forming a part of the power unit may be of a V-bank type in which a plurality of cylinders are offset from each other in the crank shaft lengthwise direction, an end surface of the cylinder block vertical to the crank shaft may be oriented substantially in parallel with the frames, the mount bracket may be attached to the end surface of the cylinder block, and the auxiliary machinery may be located on the mount seat positioned in a space made in the cylinder block by the offset arrangement of the cylinders.

With this configuration, on one end surface of the cylinder block of the engine, the mount seat can be formed in a space made in the cylinder block by the offset arrangement of the cylinders, and upon mounting the power unit to the vehicle frames, the auxiliary machinery can be mounted on the mount seat so that it does not project from the end surface of the cylinder block. As a result, the power unit can be mounted to the vehicle frames more smoothly.

Furthermore, the engine forming a part of the power unit may be of a V-bank type in which a plurality of cylinders are offset from each other in the crank shaft lengthwise direction, an end surface of the cylinder block vertical to the crank shaft may be oriented substantially in parallel with the frames, the mount bracket may be attached to the end surface of the cylinder block, and the mount seat may be formed to thrust into the blow-by gas path formed in a space made in the cylinder block by the offset arrangement of the cylinders, and the auxiliary machinery may be mounted on the mount seat.

With this configuration, both the blow-by gas path having a high effect of separating air and liquid and the auxiliary machinery mount seat can be formed on the end surface of the cylinder block, and the auxiliary machinery can be attached to the auxiliary machinery mounting seat.

BRIEF DESCRIPTION OF THE DRAWINGS

FIG. 11 is and end surface view of a cylinder block for attaching the stump portion of a mount bracket to.

DESCRIPTION OF THE PREFERRED EMBODIMENTS

An embodiment of the invention will be described below with reference to FIGS. 1 through 5.

An engine 1 according to the embodiment is a six-cylinder V-bank type four-cycle engine, with a crank shaft 2 extending horizontally, front-side three cylinders leaning frontward and rear-side three cylinders leaning rearward to for a V shape, and it is mounted in a vehicle body to extend transversely.

Figure 2:
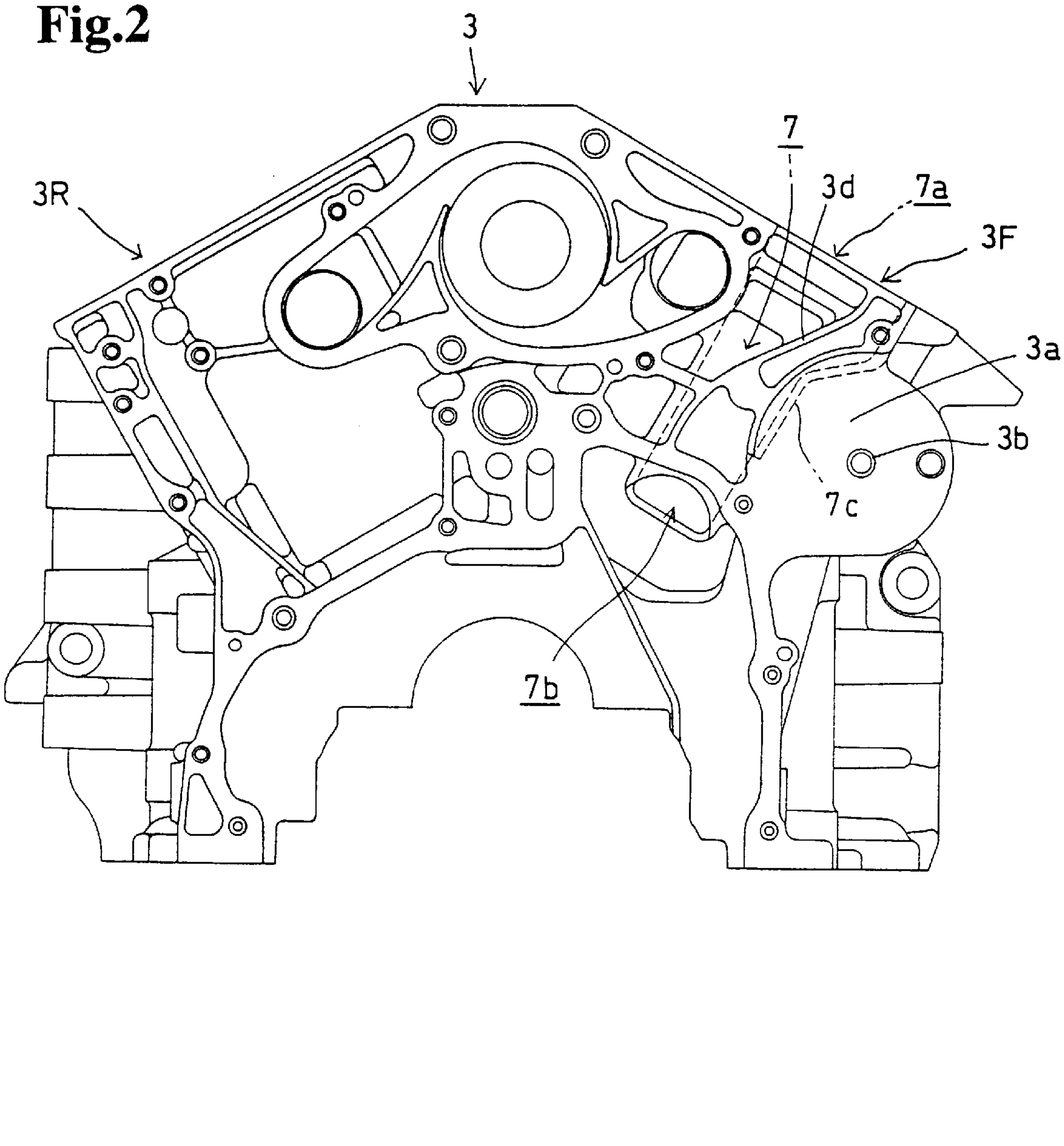
FIG. 2 is a right side elevational view of a cylinder block.
Figure 3:
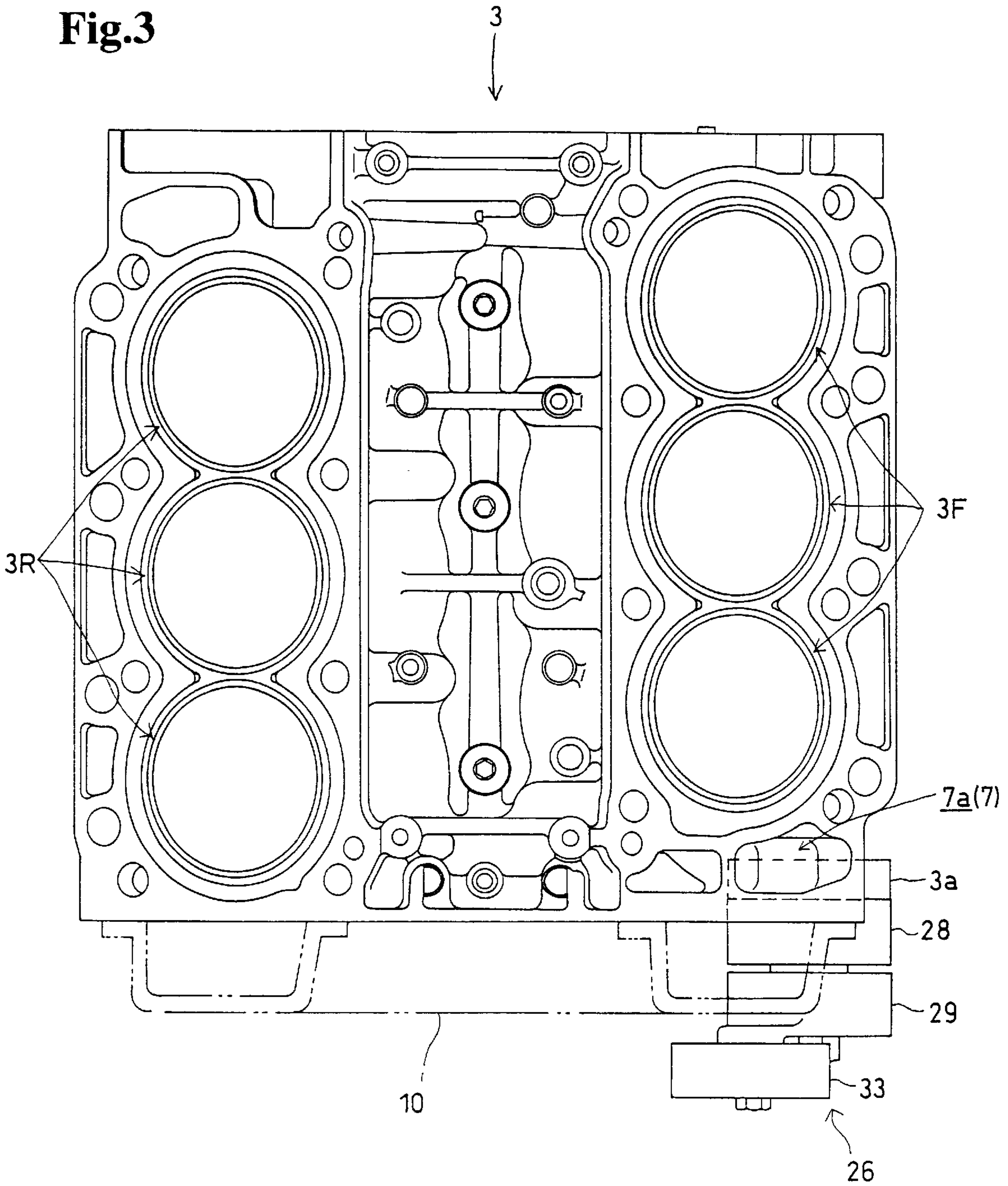
FIG. 3 is a plan view of the cylinder block for illustrating how an auto tensioner is mounted.

Therefore, a cylinder block 3 is V-shaped in the front-and-rear directions by aligned three front-side cylinders 3F and aligned three rear-side cylinders 3R as shown in FIGS. 2 and 3, and from the requirement of the position of a connecting rod, front-side cylinders 3F and rear-side cylinders are offset in left and right directions as shown in FIG. 3. That is, front-side cylinders 3F are offset leftward, and rear-side cylinders 3R are offset rightward.

Using the offset space made in the right end portion of front-side cylinders 3F that are offset leftward, a blow-by gas path 7 is formed.

That is, the blow-by gas path 7 is formed to have an inclination along cylinder bores between the right end one of the front-side cylinders 3F and the right-side end surface, and makes communication between an aperture 7*a* in the top end engaging surface of the cylinder block and an aperture 7*b* opening into the crank chamber. On respective cylinders 3F, 3R of the cylinder block 3, cylinder heads 4F, 4R, cylinder head covers 5F, 5R are sequentially stacked and united together (see FIG. 1).

To the lower end of the cylinder block 3, an oil pan 6 is attached.

Figure 5:
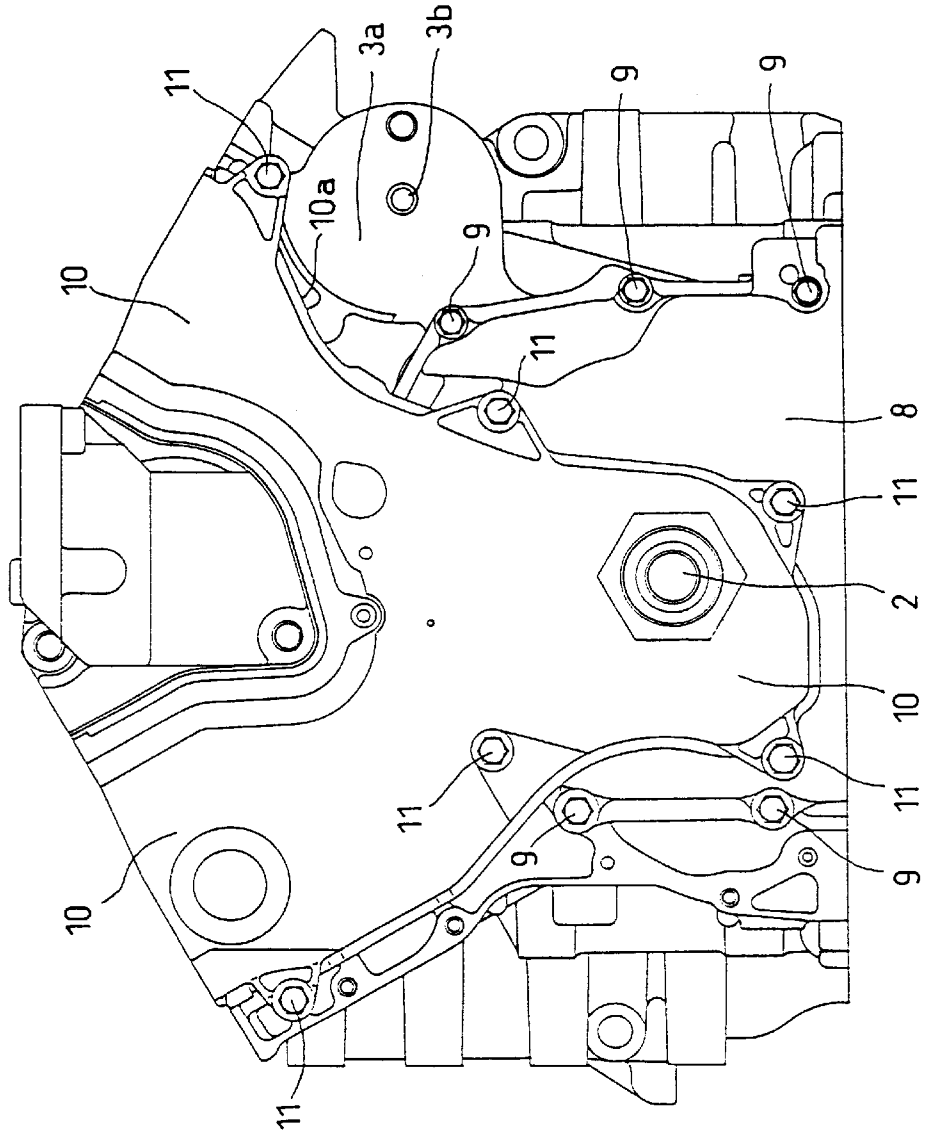
FIG. 5 is a right side elevational view illustrating how a timing belt cover, or the like, covers the cylinder block.

Referring to FIG. 5, on the right side end surface of the cylinder block 3, an oil pump body 8 is fixed by bolts 9 around the crank shaft 2, and a timing belt cover 10, which is V-shaped in its side view, is fixed by bolts 11 applied around it to lie over the right side end surface of the cylinder block 3 along the front and rear cylinders, while partially covering the oil pump body 8.

Inside the timing belt cover 10, a timing belt rotates along the right side end surface of the cylinder block 3 to transmit rotation of the crank shaft 2 to front and rear valve driving mechanisms.

Figure 1:
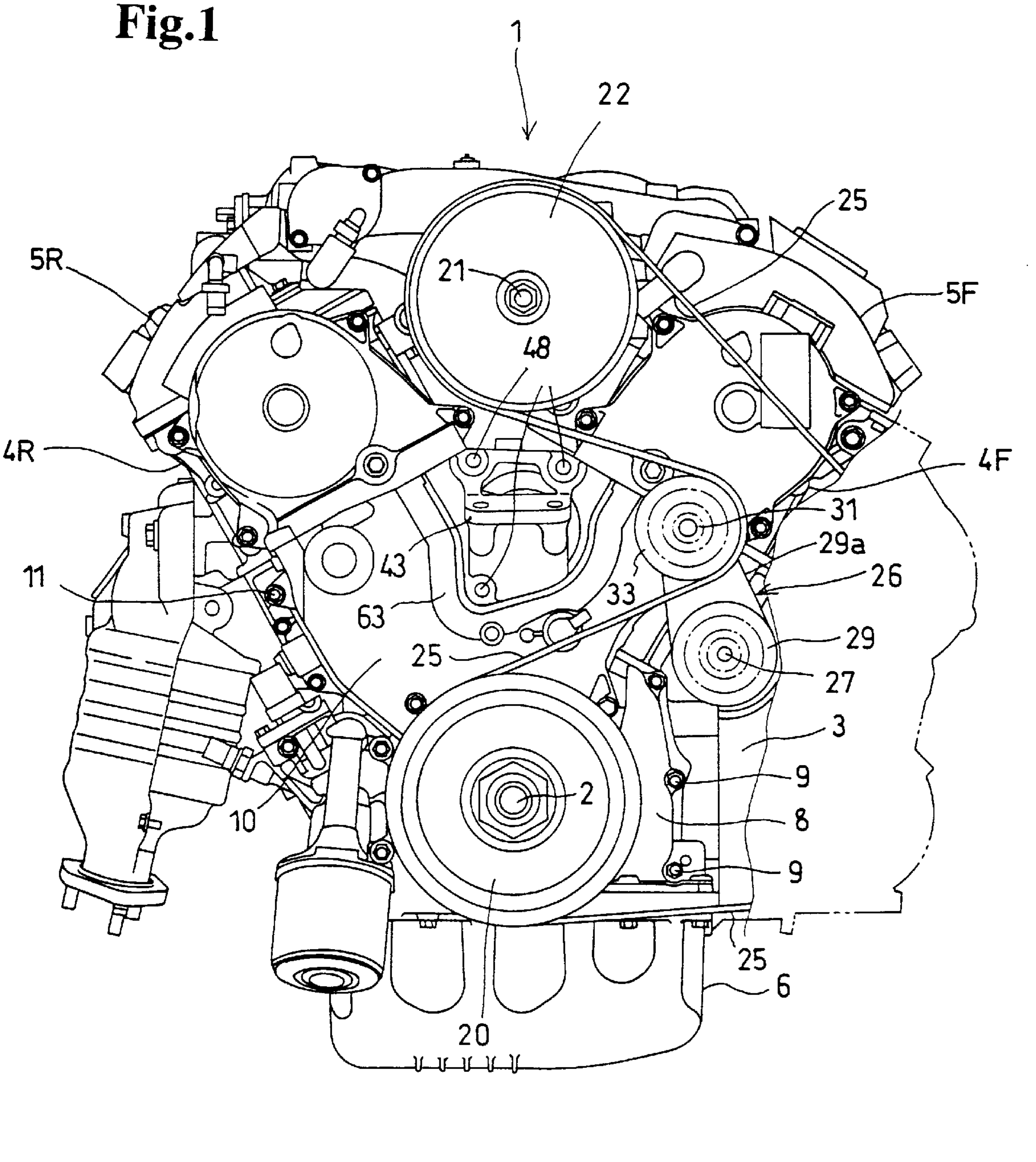
FIG. 1 is a right side elevational view of an engine according to an embodiment of the invention.

A drive pulley 20 engages at an end of the crank shaft 2 projecting rightward from the timing belt cover 10, as shown in FIG. 1, and an endless auxiliary machinery belt 25 spans over the drive pulley 20, a driven pulley 22 engaging a rotating shaft 21 of a power-steering hydraulic pump located between the front and rear cylinder head covers 5F, 5R, a driven pulley for driving other auxiliary machines such as compressor, AC generator, and so on.

Therefore, rotation of the drive pulley 20 integral with the crank shaft 2 rotates the auxiliary machinery belt 25, and rotation of the auxiliary machinery belt 25 can rotate a plurality of driven pulleys 22, etc., to drive the pump and other auxiliary machines.

An auto tensioner 26 applying an appropriate tension to the auxiliary belt 25 is attached to the cylinder block 3.

On the right side end surface of the front-side cylinders 3F of the cylinder block 3, which are offset leftward, an approximately circular mount seat 3*a* is formed not to interfere with the timing belt cover 10 as shown in FIG. 5, and the mount seat 3*a* has a fastening bolt portion 3*b* having a screw hole in its center.

Figure 4:
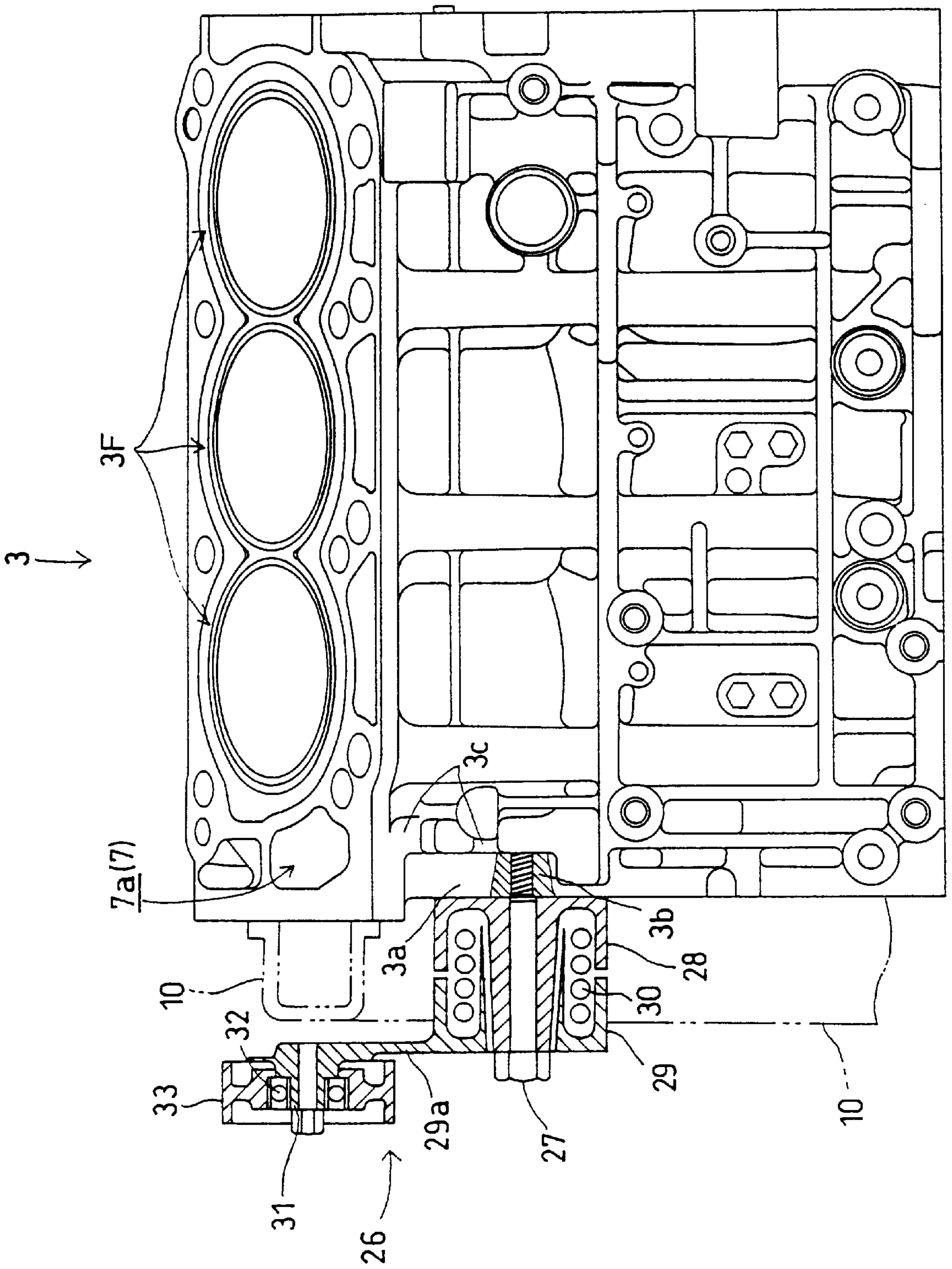
FIG. 4 is a front elevational view of same.

As shown in FIG. 4, a flat, cylindrical fixed element 28 of the auto tensioner 26 is firmly fixed to the mount seat 3*a* with an elongated fastening bolt 27 brought into threading engagement with the fastening boss portion 3*b*.

The mount seat 3*a* is formed to extend beyond the front side edge 10*a* of the timing belt cover 10, V-shaped in its side view, as shown in FIG. 5. As a result, a cover seal surface 3*d* on the part of the cylinder block 3, which is formed along the front side edge 10*a* of the timing belt cover 10, is in a close relation with the mount seat 3*a* (see FIG. 2), and it is possible to maintain a high rigidity and ensure a stable seal surface pressure.

The mount seat 3*a* extends as if biting into the blow-by gas path 7 formed in the offset space made in the left end portion of the front-side cylinders 3F (see FIG. 2) to enable downsizing the engine 1 itself.

The blow-by gas path 7 is narrowed down in its path at one of side walls 7*c* bent by the mount seat 3*a* thrusting from one side, and this configuration promotes air and liquid separation effect of the blow-by gas.

Since the auto tensioner 26 is directly attached to the mount seat formed in the cylinder block 3 that is optimum as a mounting rigid body, the auto tensioner 26 is firmly fixed.

In order to improve the rigidity of the mount seat 3*a*, a rib 3*c* can be easily provided on the back surface of the mount seat 3*a* as shown in FIG. 4, thereby to ensure a sufficient rigidity for mounting the auto tensioner 26.

The auto tensioner 26 attached to the mount seat 3*a* is fixed with the bolt 27 applied to the flat, cylindrical, fixed cylindrical body 28 as explained above, and the fixed cylindrical body 28 is secured to the mount seat 3*a* with bolts 27 passing through the elongated cylindrical boss portion 28*a*.

Then, a hollow, blind, flat, cylindrical, rotatable cylindrical body 29 having the same diameter formed to overlap the fixed cylindrical body 28 is pivotally supported by the cylindrical boss portion 28*a* to be rotatable freely.

Inside the upper and lower overlapping fixed cylindrical body 28 and rotatable cylindrical body 29, a torsion spring 30 is contained to bias the rotatable cylindrical body 29 to be rotatable in one direction (clockwise in FIG. 1).

The rotatable cylindrical body 29 has an integral arm 29*a* extending from the outer bottom wall in the centrifugal direction, and an idler pulley 33 is rotatably supported on a support shaft 31 standing on the tip of the arm 29*a* via a bearing 32.

Therefore, the idler pulley 33 turns about the bolt 27 on a level distant from the right side end surface of the cylinder block 3 approximately by the depth of the fixed cylindrical body 28 and the rotatable cylindrical body 29, and it is biased by the torsion spring 30 in the clockwise direction in FIG. 1.

In this manner, the idler pulley 33 turning on the level distant from the right side end surface of the cylinder block 3 turns closely to the outer surface of the timing belt cover 10 covering the right side end surface of the cylinder block 3 not to interfere the fixed cylindrical body 28.

The idler pulley 33 biased clockwise in FIG. 1 urges a portion of the auxiliary machinery belt 25 spanning between the drive pulley 20 engaging the crank shaft 2 and the driven pulley 22 engaging the rotating shaft 21 of the power-steering hydraulic pump to apply an appropriate tension to the auxiliary belt 25 and prevent it from loosening such that the driving power is reliably, smoothly transmitted to auxiliary machineries.

In this manner, by attaching the auto tensioner 26 directly to the mount seat 3*a* formed on the end surface of the cylinder block 3 that protrudes beyond the timing belt cover 10 (especially the right end surface of the leftward offset front-side cylinders 3F, utilizing the offset space in the same right end portion), the auxiliary machinery belt 25 can be located closer to the cylinder block 3, and the entire length of the engine 1 in the crank shaft lengthwise direction can be reduced.

Since the mount seat 3*a* is formed in the cylinder block 3, it has a high rigidity. Therefore, the cover seal surface 3*d* formed closely to the mount seat 3*a* is also ensured to be highly rigid, and its sealing effect in combination with the timing belt cover 10 can be improved.

Next explained is another embodiment of the invention shown in FIGS. 6 through 11.

Figure 6:
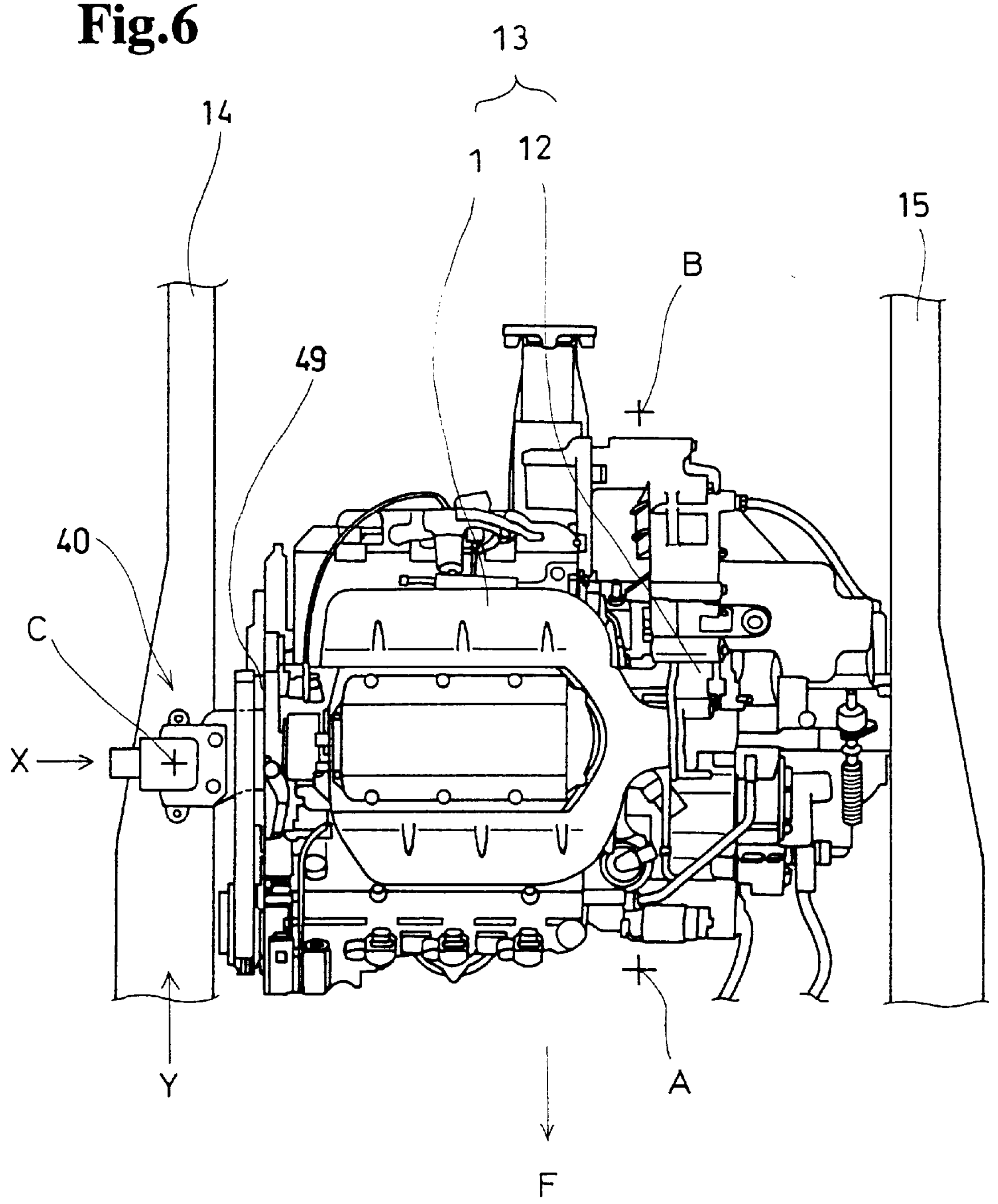
FIG. 6 is a top view of a power unit and frames to which a mount device according to a further embodiment of the invention is applied.

FIG. 6 is a top view of a power unit and vehicle frames to which the further embodiment of the invention is applied. In FIG. 6, arrow F indicates the forward of the vehicle. Reference numeral 1 denotes a V-type six-cylinder engine, and 12 is a transmission. The engine 1 and the transmission 12 are made integral to form a single power unit 13. Reference numerals 14 and 15 denote vehicle frames. Upon mounting the power unit 13 on the vehicle body, an inertial spindle mount layout is employed. This is a technique of supporting two front and rear points related to the inertial spindle of the power unit 13 and simultaneously supporting one point on the part of the engine 1. In FIG. 6, A is the front support point, B is the rear support point, and at these points, the power unit 13 is resiliently supported from its front and rear end by an underlying sub frame, not shown. C is the side support point where the side of the engine 1 of the power unit 13 is suspended by the frame 14. At the side support point C, the side of the engine of the power unit 13 is resiliently supported by the mount device 40 interposed between the end surface 16 of the cylinder block of the engine 1 and the frame 14.

Figure 7:
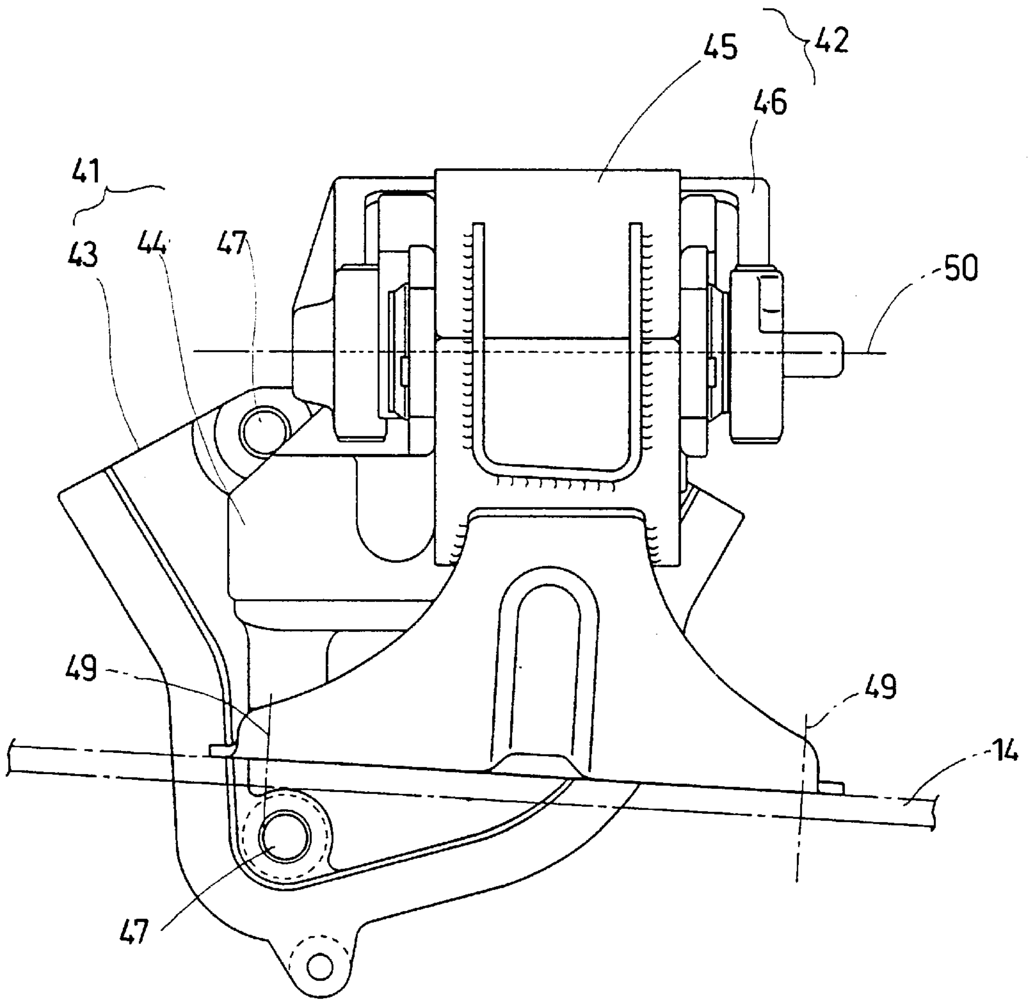
FIG. 7 is a front view of a mount device, assembled, according to an embodiment of the invention.
Figure 8:
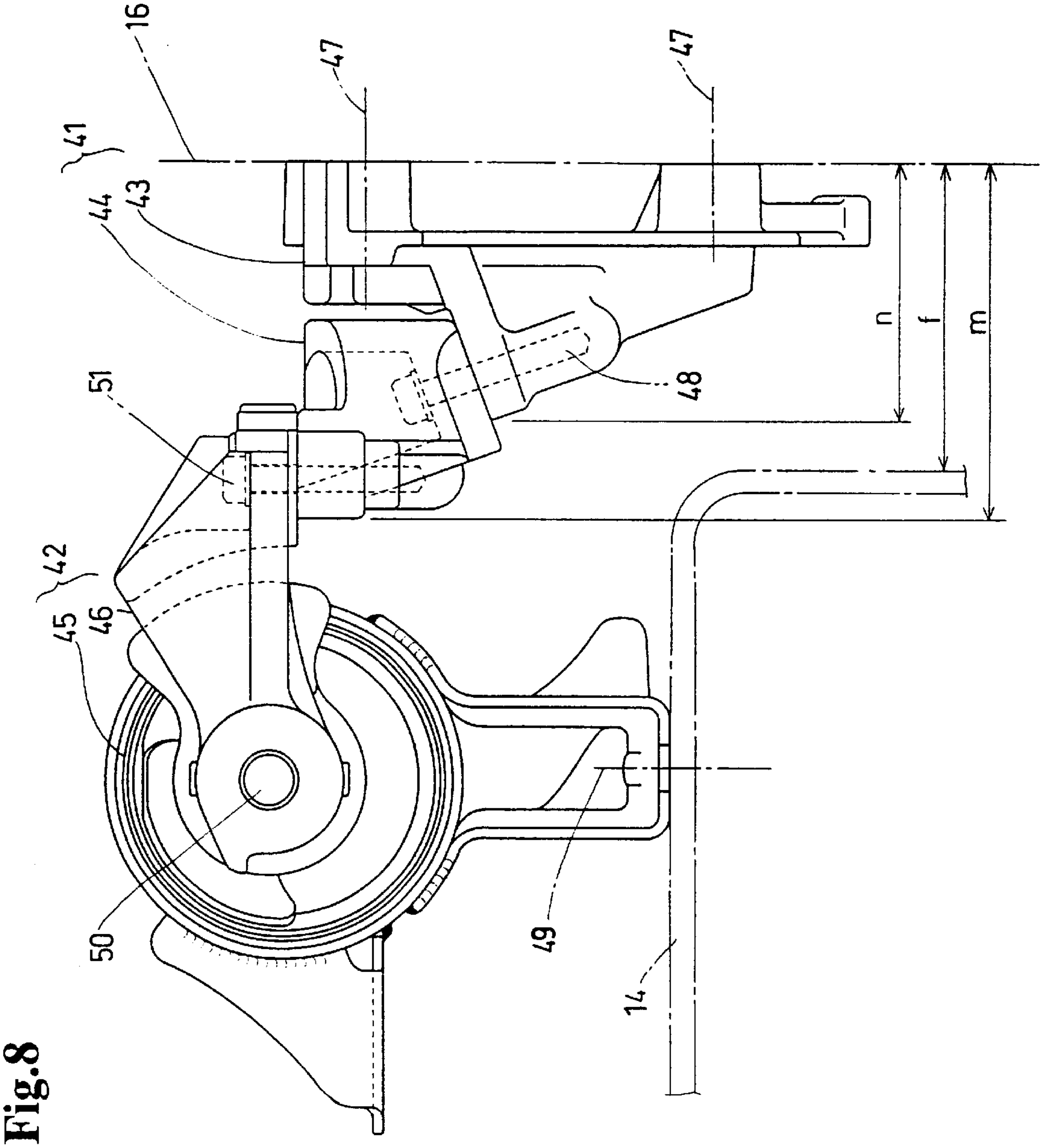
FIG. 8 is a side elevational view of the same mount device, assembled.
Figure 9:
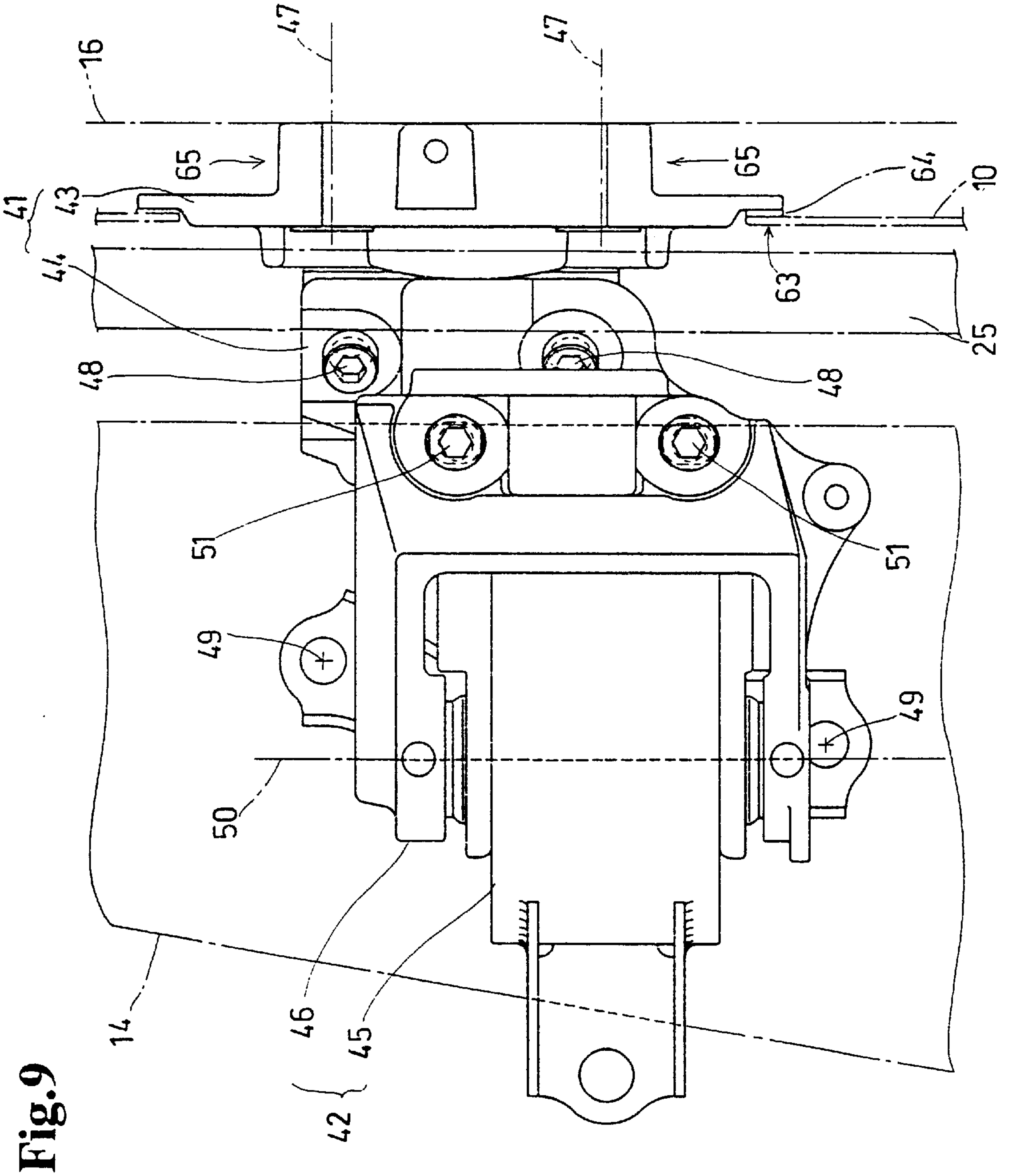
FIG. 9 is a top view of the same mount device, assembled.
Figure 10:
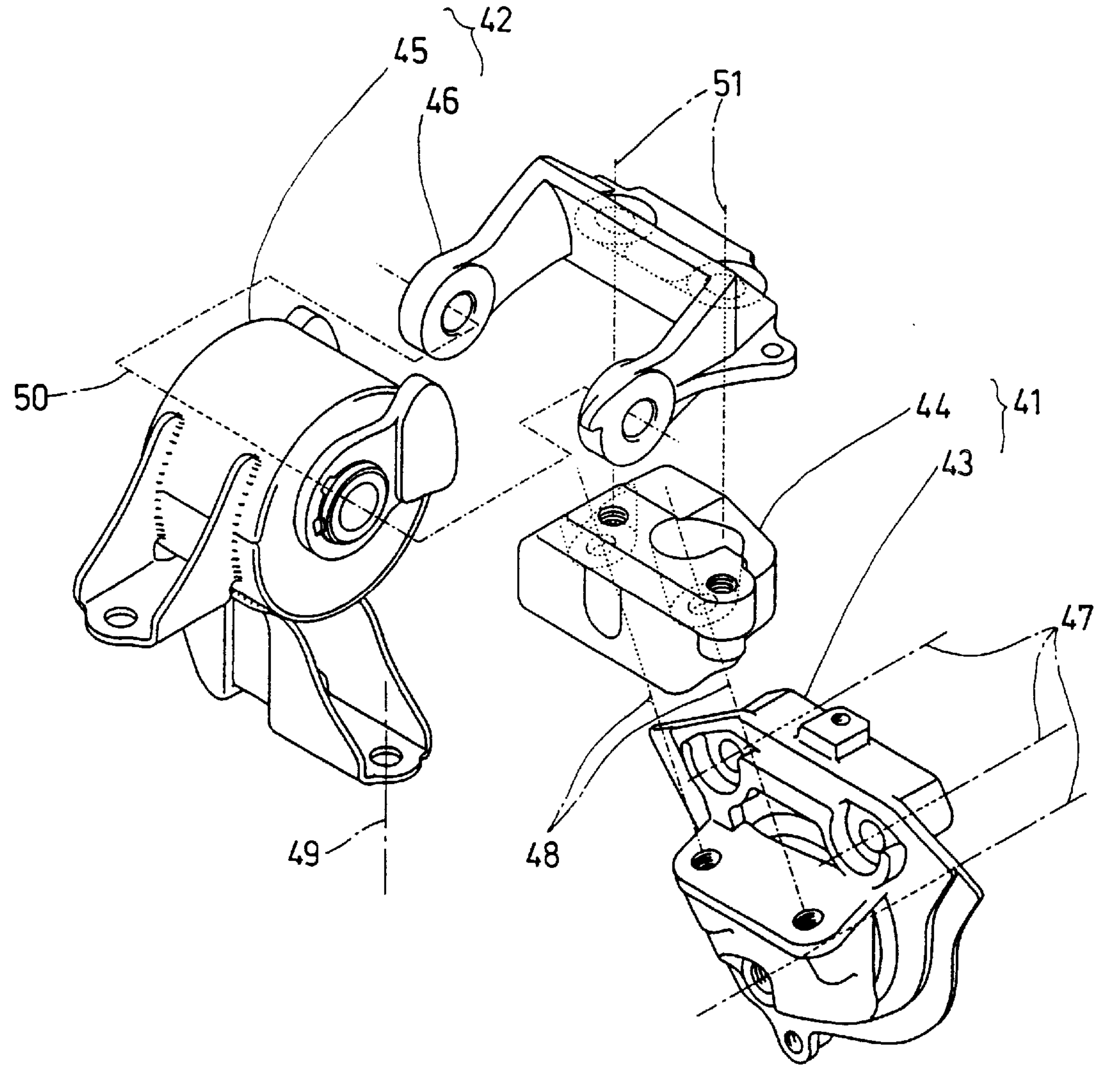
FIG. 10 is an exploded, perspective view of the same mount device.

FIG. 7 is a front view (viewed from the direction of arrow X in FIG. 6) of the mount device 40, assembled, according to the further embodiment of the invention, FIG. 8 is a side view of same (viewed from the direction of arrow Y in FIG. 6), and FIG. 9 is a top view of same. FIG. 10 is an exploded perspective view of the device, in which coupling relations are shown by dot-and-dash lines.

The mount device 40 is made up of generally two sections. One of them is a mount bracket 41 attached to the power unit 13, and the other is a frame-side support portion 42 attached to the frame 14. In FIGS. 7 through 10, the mount bracket 41 is composed of a mount bracket stump portion 43 and a mount bracket extension 44. The frame-side support portion 42 is composed of a resilient support member 45 and an arm member 46.

Upon mounting the power unit, the frame-side support portion 42 is attached to the frame 14 before lifting the power unit. The resilient support member 45 of the same support portion is attached to the vehicle frame 14 with a bolt 49. The arm member 46 is pivotally attached to the resilient support member 45. The resultant assembled unit is the frame-side support portion 42. The resilient support member 45 combined with the arm member 46 may be attached to the vehicle frame 14. Although the arm member 46 is finally united with the mount bracket extension 44, the arm member 46 is rotated about the shaft 50 to stand vertically above before it is actually united, not to prevent works of mounting the mount bracket extension 44 and adjusting the position of the mount bracket.

The mount bracket stump portion 43 is attached to the end surface of the cylinder block with bolts 47. The mount bracket extension 44 is attached to the mount bracket stump portion 43 with bolts 48 after lifting the power unit 13 from below the vehicle body and up to the level where the mount bracket stump portion 43 comes above the frame 14. At the stage where the mount bracket stump portion 43 and the mount bracket extension 44 are united, they functions as a mount bracket 41 of a full size.

After completing attachment of the mount bracket extension 44, attachment of the frame-side support portion 42 and positional adjustment of the power unit 13 relative to the frame 14, the arm member 46 is rotated down, and connected to the mount bracket extension 44 with bolts 51, thereby to complete assembly of the engine-side support point C (FIG. 6) of the power unit.

As explained above, the combination of the mount bracket stump portion 43 and the mount bracket extension 44 functions as the mount bracket 41 with the full size. Size of the combined mount bracket measured from the cylinder block end surface 16 is m, as shown in FIG. 8, and it is the full size of the mount bracket. Size of the mount bracket stump portion 43 alone measured from the cylinder block end surface 16 is n as shown in FIG. 8, and it is shorter than m. In case of not having ample room between the transmission 12 and the right frame 15, like the power unit shown in FIG. 6, a power unit having a mount bracket prepared as an integral element having the full size cannot pass between through the frames 14 and 15. However, in the configuration of this embodiment in which the mount bracket is composed of divisional elements, namely, the stump portion 43 and the extension 44, since the power unit, assembled with the stump portion 43 alone, can pass the gap, only after it passes through, by connecting the extension 44 to the mount bracket stump portion 43, the mount bracket with the full size m can be finished. Thereby, the power unit can be mounted in a vehicle with narrower-spaced frames than the case of using a full-size integral mount bracket, and it permits the frame distance to be narrower for downsizing the vehicle.

Figure 11:
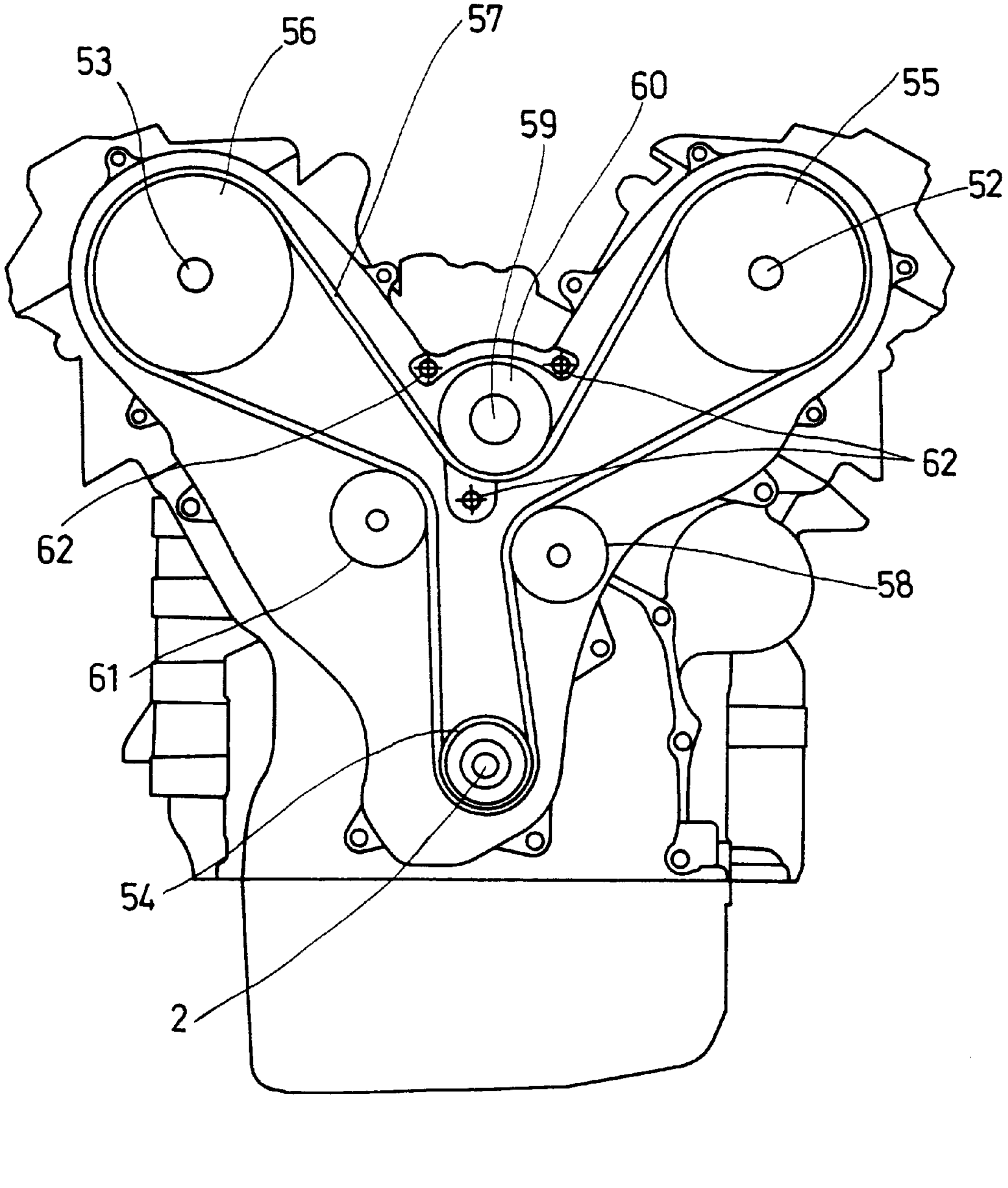
Figure 12:
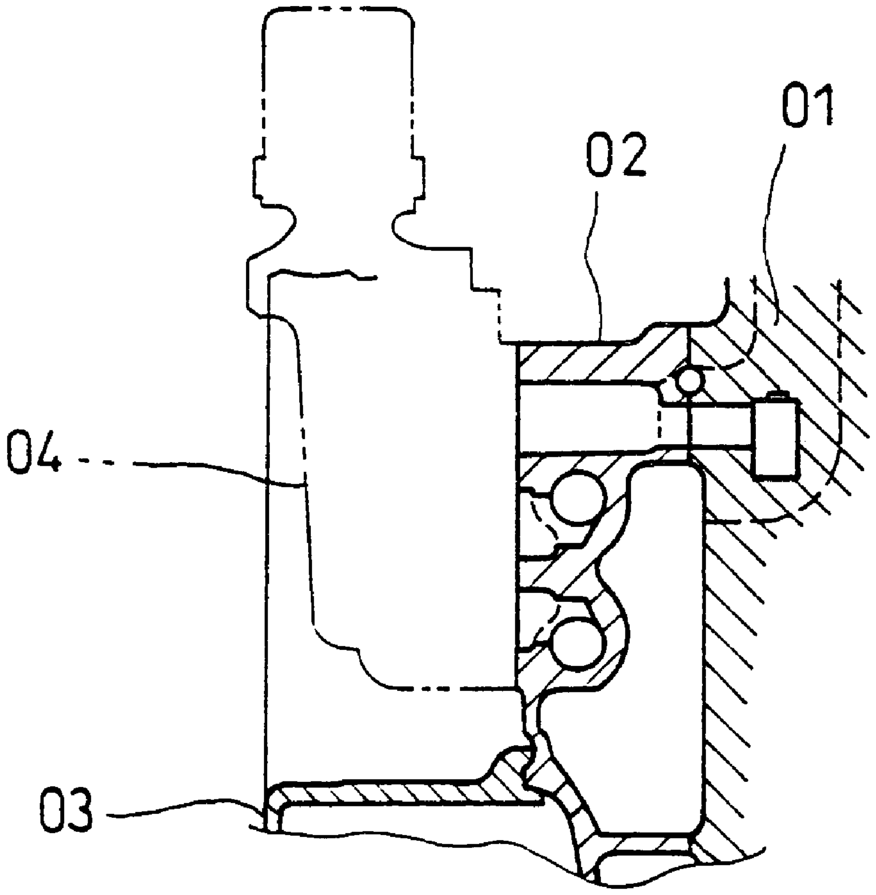
FIG. 12 is a cross-sectional view of an end portion of a conventional cylinder block.

FIG. 11 is an end surface diagram of the cylinder block for attaching the mount bracket stump portion 43 to. In FIG. 11, reference numeral 2 denotes the cranks shaft, 52 and 53 denote valve driving cam shafts, 54 a cam driving pulley mounted on the cranks shaft, 55 and 56 refer to driven pulleys fixed to the valve driving cam shafts 52, 53, and 57 to a timing belt as a transmission member, which is provided to wrap the driving pulley 54 and the driven pulleys 55, 56. Although not shown in FIG. 11, each of the pulleys is furnished with teeth, and the timing belt 57 is a toothed belt furnished with teeth inside, which can bite with teeth of the pulleys 54, 55, 56. Between the driving pulley 54 and the driven pulley 55, an idler pulley 58 as a path changing means engages with the timing belt 57. In the span between the driven pulleys 55, 56, the timing belt 57 wraps a water pump driven pulley 60 at one end of a water pump shaft 59. In the span between the driven pulley 56 and the driving pulley 54, a tensioner pulley 61 engages with the outer surface of the timing belt 57 to urge it with a spring force.

Around the water pump driven pulley 60, there are portions where the end surface of the cylinder block is exposed, and three bolt holes 62 are formed there. They are holes for mounting the mount bracket stump portion 43 with three bolts 47 (see FIG. 11). The mount bracket stump 43 is assembled to cover the water pump driven pulley 60.

FIG. 1 is a diagram illustrating a step after the mount bracket stump portion 43 is attached. As explained above, after the mount bracket stump portion 43 is attached to the end surface 16 of the cylinder block with bolts 47, the timing belt cover 10, substantially V-shaped, is mounted. This covers the timing belt 57 and some exposed pulleys 54, 55, 56, 58, 61. The timing belt cover 10 has a portion 63 overlapping right left portions and a lower portion of the mount bracket stump portion 43. As shown in FIG. 9, a seal member 64 is interposed in that portion to seal the timing belt chamber. Thereafter, as shown in FIG. 1, the auxiliary machinery driving pulley 20 is attached to the crank shaft 2, and respective driven pulleys are also attached to shafts of auxiliary machineries. In this status, the power unit is lifted from below the vehicle body, and when the mount bracket stump portion 43 comes above the level of the frame 13, the mount bracket extension 44 shown in FIG. 10 is connected. In FIG. 9, s space 65 is the path of the timing belt 57. Position of the auxiliary belt 25 is shown by a dot-and-dash line.

What is claimed is:

1. An auxiliary machinery mounting structure of an engine comprising an oil pump body attached to an end surface of a cylinder block extending vertically and perpendicularly to a crankshaft of said engine, and a mount seat for an auxiliary machinery, said mount seat being formed integrally with and on said end surface to lie outward of and along a cover seal surface which is a surface engaging with a cover laid over said end surface, and an auxiliary machinery being mounted on said mount seat.

2. An auxiliary machinery mounting structure of an engine according to claim 1, wherein said mount seat thrusts into a blow-by gas path formed in said cylinder block.

3. An auxiliary machinery mounting structure of an engine according to claim 1, wherein said auxiliary machinery is an auto tensioner.

4. An auxiliary machinery mounting structure of an engine according to claim 1, wherein said auxiliary machinery is mounted directly on said mount seat formed in said cylinder block.

5. An auxiliary machinery mounting structure of an engine according to claim 1, wherein said engine is a V-bank engine in which a plurality of cylinders are offset from each other in the lengthwise direction of said crank shaft.

6. An auxiliary machinery mounting structure of an engine according to claim 1, wherein said engine is a V-bank engine in which a plurality of cylinders are offset from each other in the lengthwise direction of said crank shaft, and a blow-by gas path of said cylinder block is formed in a space made by offset arrangement of said cylinders.

7. A power unit mounting device used at a portion where a power unit is suspended to one of vehicle frames when mounted by lifting it from below and through said vehicle frames, comprising a mount bracket to be attached to said power unit, said mount bracket including a stump having a short size shorter than a full length required for said mount bracket and an extension to be connected to said stump to make up the full length and a frame-side support member to be connected to said one of the frames, said support member including a resilient support portion supporting a shaft therein and an arm member pivotally supported by said shaft, said arm member being pivotable between a first position away from said extension and a second position at which the arm member is adjacent to said extension to be connected to the same.

8. A power unit mounting device according to claim 7, wherein said extension of said mount bracket is positioned in a location overlapping said vehicle frames when viewed from above.

9. A power unit mounting device used at a portion where a power unit is suspended to one of vehicle frames when mounted by lifting it from below and through said vehicle frames, wherein a mount bracket to be attached to said power unit is composed of a stump having a short size and an extension to be connected to make up the full length required for said mount bracket, wherein an end surface of a cylinder block vertical to a crank shaft of an engine forming a part of said power unit is oriented substantially in parallel with said frames, and wherein an auxiliary machinery mount seat is integrally formed at a location along a cover seal surface of an engaging surface of a cover laid over said end surface of said cylinder block outside said cover seal surface, an auxiliary machinery being mounted on said mount seat, and said mount bracket being attached to said end surface of said cylinder block.

10. A power unit mounting device used at a portion where a power unit is suspended to one of vehicle frames when mounted by lifting it from below and through said vehicle frames, wherein a mount bracket to be attached to said power unit is composed of a stump having a short size and an extension to be connected to make up the full length required for said mount bracket, wherein an end surface of a cylinder block vertical to a crank shaft of an engine forming a part of said power unit is oriented substantially in parallel with said frames, and wherein an auxiliary machinery mount seat is integrally formed at a location along a cover seal surface of an engaging surface of a cover laid over said end surface of said cylinder block outside said cover seal surface, an auxiliary machinery being mounted on said mount seat, and said mount bracket being formed to thrust into a blow-by gas path formed in said cylinder block.

11. A power unit mounting device used at a portion where a power unit is suspended to one of vehicle frames when mounted by lifting it from below and through said vehicle frames, wherein a mount bracket to be attached to said power unit is composed of a stump having a short size and an extension to be connected to make up the full length required for said mount bracket, wherein an engine forming a part of said power unit is a V-bank engine in which a plurality of cylinders are offset from each other in the lengthwise direction of a crank shaft, and wherein an end surface of a cylinder block vertical to a crank shaft of an engine forming a part of said power unit is oriented substantially in parallel with said frames, said mount bracket being attached to said end surface of said cylinder block, and an auxiliary machinery being mounted in a space made by offset arrangement of said cylinders.

12. A power unit mounting device used at a portion where a power unit is suspended to one of vehicle frames when mounted by lifting it from below and through said vehicle frames, wherein a mount bracket to be attached to said power unit is composed of a stump having a short size and an extension to be connected to make up the full length required for said mount bracket, wherein an engine forming a part of said power unit is a V-bank engine in which a plurality of cylinders are offset from each other in the lengthwise direction of a crank shaft, and wherein an end surface of a cylinder block vertical to a crank shaft of an engine forming a part of said power unit is oriented substantially in parallel with said frames, said mount bracket being attached to said end surface of said cylinder block, and an auxiliary machinery being mounted on a mount seat formed a space made in said cylinder block by offset arrangement of said cylinders.

13. A power unit mounting device used at a portion where a power unit is suspended to one of vehicle frames when mounted by lifting it from below and through said vehicle frames, wherein a mount bracket to be attached to said power unit is composed of a stump having a short size and an extension to be connected to make up the full length required said cylinders, and an auxiliary machinery being mounted on said mount seat.

14. A power unit mounting device used at a portion where a power unit is suspended to one of vehicle frames when mounted by lifting it from below and through said vehicle frames, comprising:

a mount bracket to be attached to said power unit, said mount bracket being composed of at least two components, one of the components being a stump attached to the power unit and having such a short size that does not interfere with the vehicle frames when the power unit is to be mounted, the other component being an extension member to be connected to said stump to make up a full length required for the mount bracket when the power unit is to be mounted and a frame-side support member to be connected to said one of the vehicle frames, said frame-side support member being attachable to said extension member when the power unit mounting device is attached in position.

* * * * *